F. W. SHAW.
Flat Iron Heater.
No. 1,859.
Reissued Jan. 31, 1865.
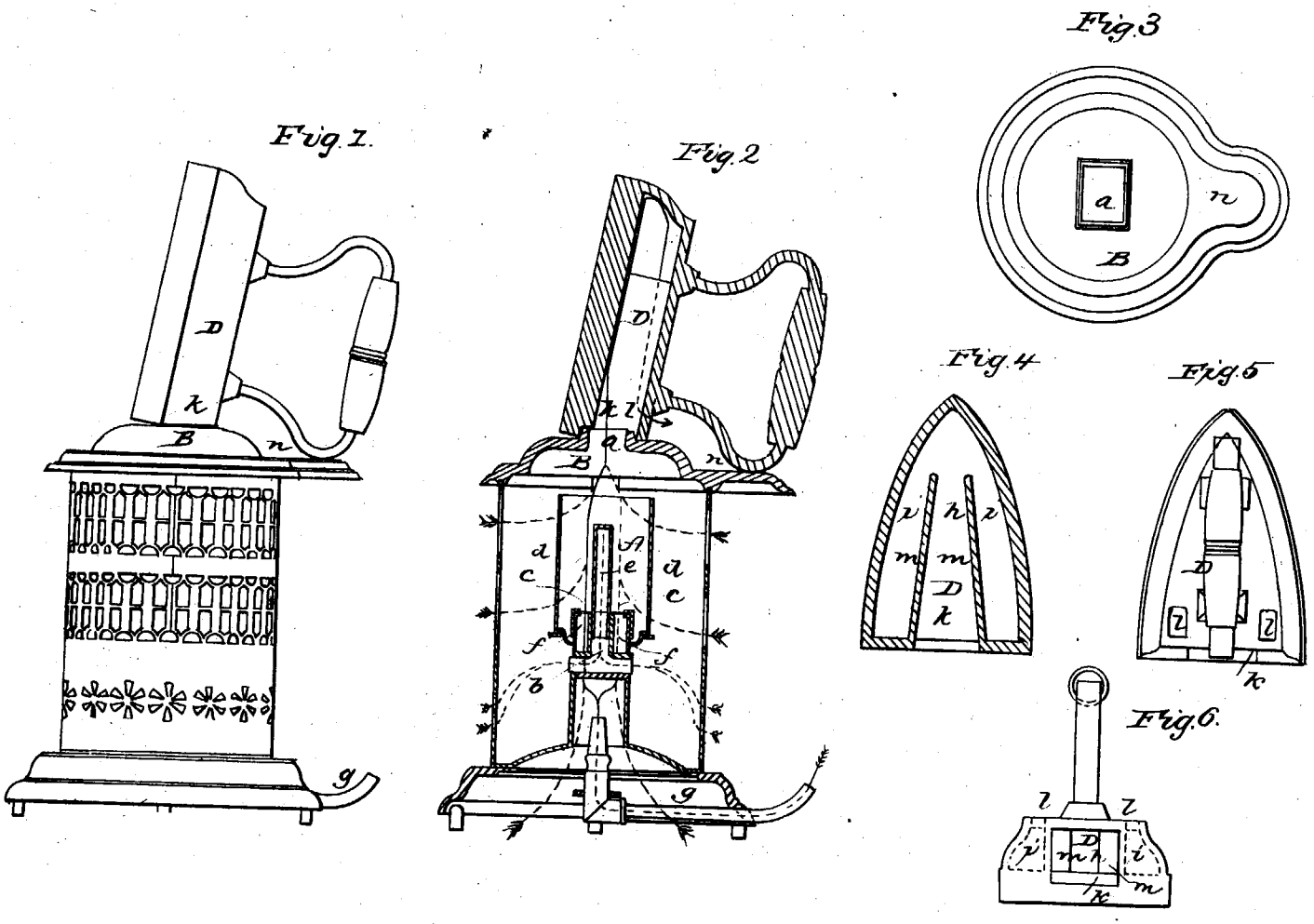
N. PETERS, Photo-Lithographer, Washington, D. C.

UNITED STATES PATENT OFFICE.

WILLIAM F. SHAW, OF BOSTON, MASSACHUSETTS.

HEATER FOR SMOOTHING-IRONS.

Specification forming part of Letters Patent No. 18,108, dated September 1, 1857; Reissue No. 1,859, dated January 31, 1865.

*To all whom it may concern:*

Be it known that I, WILLIAM F. SHAW, of Boston, in the county of Suffolk and State of Massachusetts, have invented a new and useful Improved Apparatus for Heating Flat-Irons; and I hereby do declare that the same is fully described and represented in the following specification and the accompanying drawings, of which—

Figure 1 denotes an elevation of the apparatus; Fig. 2, a vertical and transverse section of the same; Fig. 3, a top view of the stand on which the flat-iron is supported; Fig. 4, a longitudinal section of the flat-iron, the same being taken through its flues and parallel with its smoothing-face. Fig. 5 is an elevation of the flat-iron, and exhibits its outlet-passages. Fig. 6 is a rear elevation of the flat-iron, made to show the inlet-passage.

In the drawings, A represents an air and gas burner inclosed within a case or placed directly under a stand, B, which is made with a discharge opening or neck, as shown at *a*. This opening or neck serves as a conductor through which the heat and volatile products of combustion pass and enter the body of the flat-iron, the latter being placed upon the stand and fitted over the said neck, as shown in the drawings.

The burner is of the Argand kind, or constructed so as to have an inner air-tube, *b*, by which air may be conducted into the interior of the flame caused by the combustion of air and gas on an annular perforated or wire-gauze cap, *c*, situated on the top of an air and gas receiving chamber, *f*, surrounding the tube *b* and made open at the bottom to receive air. A tube, *g*, for supplying the chamber *f* with inflammable gas, may lead into it in any proper manner.

The cap *c* is surrounded by a perforated or wire-gauze tube, *d*, which extends from it, as shown in Fig. 2. It also has another wire-gauze or perforated tube, *e*, extending from the inner air-current tube, *b*, and arranged concentrically with the tube *d*. Each of the said tubes *d* and *e* should be made with numerous holes extending throughout its entire sides, so as to permit many small streams of air to flow through the side of the said tube into the flame, which may be on or near the cap when the apparatus is in operation. The two tubes *d* and *e* operating together serve greatly to improve the heating process of the flame and prevent the formation of aldehyde and formic acid or noxious vapors or gases.

The flat-iron is constructed with a chamber or flue space, D, arranged within its body, and provided with an inlet-opening, *k*, in the heel of the iron. The flue-space is also furnished with one or more discharge passages or outlets, as shown at *l l*. This flue-space, as represented in Fig. 4 of the drawings, is divided by two partitions, *m m*, into one ascending and two descending flues, *h i i*, the latter two having outlets *l l*, made laterally through the iron at their lower ends.

The smoothing-iron might be made with one single ascending and one single descending flue, but I prefer two descending flues, as they serve to effect a better or more even distribution of the heat over the smoothing-surface of the iron. Without such flues that part of the iron in proximity to its nose or front end would become very much more heated than the heel of the iron, and consequently would be likely to burn an article on which it might be used.

The stand is made with a projection or rest, *n*, for sustaining the handle of the iron, such rest being arranged so as to cause the iron to take an inclined position, as shown in Figs. 1 and 2, whereby it is caused to heat to better advantage than when it stands upright. By my invention a flat-iron or smoothing-iron may be heated to great advantage and little cost by means of gas burned with air, as specified.

I do not claim heating a flat-iron by means of a lamp having its wick-tube or flame of its wick within the body of the iron; nor do I claim heating a flat-iron by charcoal or other fuel burned in a chamber made within the body of the iron; nor do I claim herein the application of a wire-gauze or perforated chimney to an air and gas burner so as to surround the flame, as such has heretofore been patented by me; but

What I claim, and desire to secure by Letters Patent, is—

1. The combination of a heating apparatus, in which gas or hydrocarbon vapors are used as or for fuel, with a stand or support, B, made so as to gather the heat and products of combustion and conduct them into the chamber or interior of the iron, substantially as specified.

2. Making the flat-iron D with an ascending and descending flue or flues, *i i* and *h*, inlet and discharge openings *k* and *l l*, arranged in the body of the iron, and so as to be used with a burner and stand, substantially as specified.

3. So constructing the stand or rest *n* for sustaining the handle of the flat-iron as to cause the face of the iron to take an inclined position, as and for the purpose specified.

4. Making the stand or support B with a tubular projecting neck, as and for the purpose specified.

W. F. SHAW.

Witnesses:
H. A. BROWN,
JAMES G. GOODNOW.